United States Patent [19]
Bieniek

[11] Patent Number: 5,137,317
[45] Date of Patent: Aug. 11, 1992

[54] SHOVEL LIFT APPARATUS

[76] Inventor: Christopher Bieniek, 7305 Sisson Hwy., Hamburg, N.Y. 14075

[21] Appl. No.: 785,314

[22] Filed: Oct. 30, 1991

Related U.S. Application Data

[63] Continuation-in-part of Ser. No. 679,955, Apr. 3, 1991, abandoned.

[51] Int. Cl.$^5$ ............................ A01B 1/22; B25G 1/04
[52] U.S. Cl. .................................... 294/58; 294/54.5
[58] Field of Search ...................... 294/49, 54.5, 57–59; 15/143 R, 144 R, 144 B, 145; 16/110 R, 111 R, 114 R, 124; 37/265, 285; 254/131.5

[56] References Cited

U.S. PATENT DOCUMENTS

| | | | |
|---|---|---|---|
| 120,607 | 11/1871 | Alsip | 294/58 |
| 826,928 | 7/1906 | Fleck | 294/58 |
| 875,504 | 12/1907 | Clark | 294/58 |
| 1,074,889 | 10/1913 | Moore | 294/58 |
| 2,337,643 | 12/1943 | Buser | 294/58 |
| 2,416,414 | 2/1947 | Spencer | 294/58 |
| 3,436,111 | 4/1969 | England | 294/57 X |
| 3,751,094 | 8/1973 | Bohler | 294/58 |
| 4,050,728 | 9/1977 | Davidson | 294/58 |
| 4,128,266 | 12/1978 | Vaslas | 294/58 |
| 4,690,447 | 9/1987 | Adams | 294/58 X |

FOREIGN PATENT DOCUMENTS

| | | | |
|---|---|---|---|
| 28631 | 2/1986 | Japan | 294/58 |
| 31276 | 10/1920 | Norway | 294/58 |
| 166779 | 7/1921 | United Kingdom | 294/58 |
| 322531 | 12/1929 | United Kingdom | 294/58 |

Primary Examiner—Johnny D. Cherry
Attorney, Agent, or Firm—Hodgson, Russ Andrews, Woods & Goodyear

[57] ABSTRACT

Apparatus for attachment to a shovel for assisting lift thereof. A first pair of telescopingly length adjustable tubes is attached at one end to the shovel handle near the hand grip. A second pair of telescopingly length adjustable tubes is attached at one end to the shovel handle near the scoop. The first pair is attached at the other end to the other end of the second pair of tubes to provide a raised hand hold for increased mechanical advantage, wherein less bending is required. The adjustability of the pairs of tubes allows quick and easy attachment to shovels of various sizes universally. An elbow extension from the first pair of tubes allows a hand hold directly over the scoop. The elbow extension is rotatably adjustable to allow movement of a loaded scoop straight up or down or to the side, as desired, for unloading easily.

12 Claims, 2 Drawing Sheets

SHOVEL LIFT APPARATUS

This application is a continuation-in-part of U.S. patent application Ser. No. 679,955, filed Apr. 3, 1991, now abandoned, the disclosure of which is hereby incorporated herein by reference.

The present invention relates generally to shovels such as, for example, snow shovels. The term "shovel" is meant to include other similar push or lift tools. More particularly, the present invention relates to shovel lift apparatus.

Shovels have been provided with attachments for the purposes of providing raised hand holds for aiding the lifting of a load on the shovel blade or work surface. In this regard, see U.S. Pat. Nos. 2,337,643; 120,607; 826,928; 875,504; 1,074,889; 2,416,414; 3,436,111; 3,751,094; and 4,690,447; Norwegian patent document 31,276; British patent documents 166,779 and 322,531; and Japanese patent document 28,631.

The various shovel attachments shown in the above references cannot be readily and easily attached to shovels of different sizes in such a way as to provide the optimum mechanical advantage for the particular shovel and particular user thereof.

It is accordingly an object of the present invention to provide a shovel lift apparatus which may be readily and easily attachable to shovels of various sizes for achieving optimum mechanical advantage.

It is a further object of the present invention to provide such apparatus which allows easier handling of a loaded shovel.

In accordance with the present invention an increased mechanical advantage may be achieved for assisting lift of a loaded shovel by attaching thereto an apparatus which comprises a pair of tubular elongate means each of which is telescopically adjustable with the tubular means attached to each other at one end and with the other ends attached near the scoop or blade end and the hand grip end of the handle respectively of the shovel. Such an apparatus may be quickly and easily attached to a shovel for use and detached for storage. The resulting adjustability of the lengths of the tubular means allows the apparatus to be universally attached to shovels of various handle lengths and further allows optimum mechanical advantage to be achieved for the shovel length and size of the person using the shovel. A rotatively adjustable elbow-shaped member is also attached to the one end portion of the tubular means which is attached to the shovel handle near the hand grip end thereof as an extension thereof so that it may be located directly over the loaded scoop during lifting thereof for optimum mechanical advantage and may be rotated to an optimum position for easily holding for movement of the loaded scoop to the side or straight up, as desired, for discharging the load therefrom.

Other objects, features, and advantages of the present invention will be apparent in the following detailed description of the preferred embodiment thereof taken in conjunction with the accompanying drawings wherein like reference numerals denote like or similar parts throughout the several views.

DETAILED DESCRIPTION OF THE PREFERRED EMBODIMENTS

Figure 1:
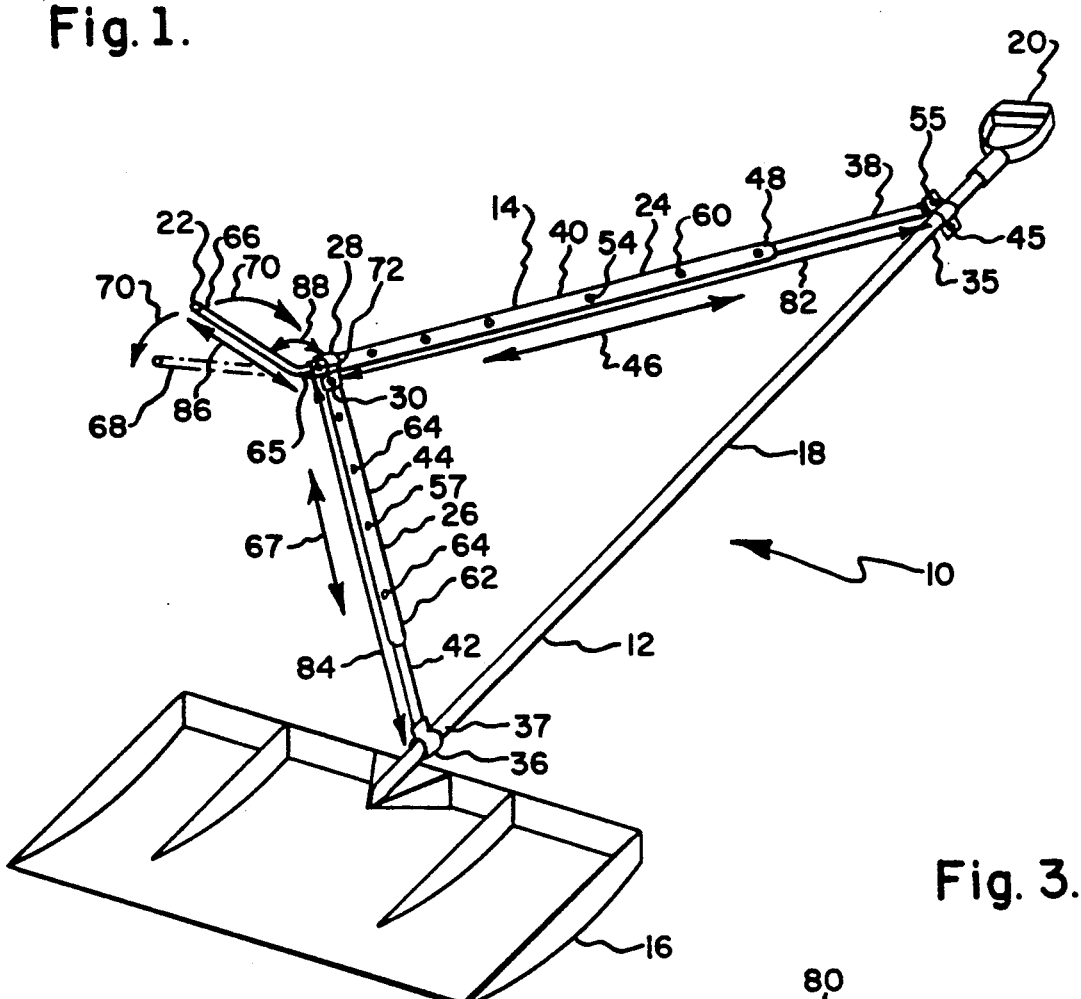
FIG. 1 is a perspective view of a shovel with a lift apparatus attached in accordance with the present invention.

Referring to FIG. 1, there is shown generally at 10 apparatus which includes a shovel 12 to which is attached a kit or assembly 14 for providing increased mechanical advantage for assisting lift of the loaded shovel as will be described in greater detail hereinafter.

Shovel 12 includes a scoop or blade 16 for shoveling snow, an elongate handle 18 attached thereto, and a hand grip 20 attached to the opposite end of the handle. Shovel 12 is of a conventional type and may come in various sizes having handles of various lengths. Shovel 12 may be any other kind of shovel or may be a similar push or lift tool.

Use of a snow shovel typically requires a person to hold the grip 20 with one hand and to hold the handle at a point toward the scoop end thereof with the other hand for use. This requires constant bending on the part of the user and does not allow optimum mechanical advantage to be achieved during lifting of the loaded scoop. In order to optimize the mechanical advantage during lifting as well as reducing or eliminating the amount of bending required, in accordance with the present invention the kit 14 is provided to allow gripping by the other hand at a point which is generally at about the same height as the height of the hand grip 20 and which is generally above the scoop 16 when the shovel is in a normal position with the scoop being slid along a driveway during use. Thus, member 22, which will be described in greater detail hereinafter, is provided at generally this location for grasping by the other hand.

Figure 5:
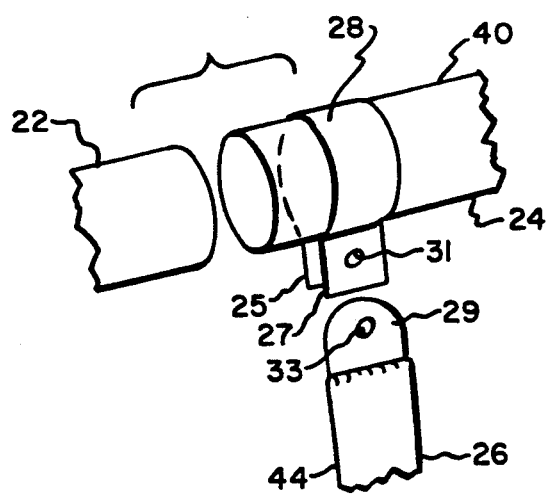
FIG. 5 is a view similar to that of FIG. 4 illustrating the attachment of the long tubular means of the lift apparatus of FIG. 1 to the short tubular means thereof.

The kit 14 includes first and second tubular means 24 and 26 which, as best shown in FIG. 5, are joined at one end by suitable means such as round split clamp 28, which surroundingly engages tubular means 24 and receives between a pair of flanges 25 and 27 thereof a flattened end portion 29 of tubular means 26 and is attached thereto by means of a screw 30 (shown in FIG. 1) which passes through apertures 31 and 33 in flanges 25 and 27 and in flattened portion 29 respectively and is secured by a wing nut (not shown) or other suitable means. Tubular means 26 is thus pivotally attached to tubular means 24 as at screw or pivot 30.

Figure 4:
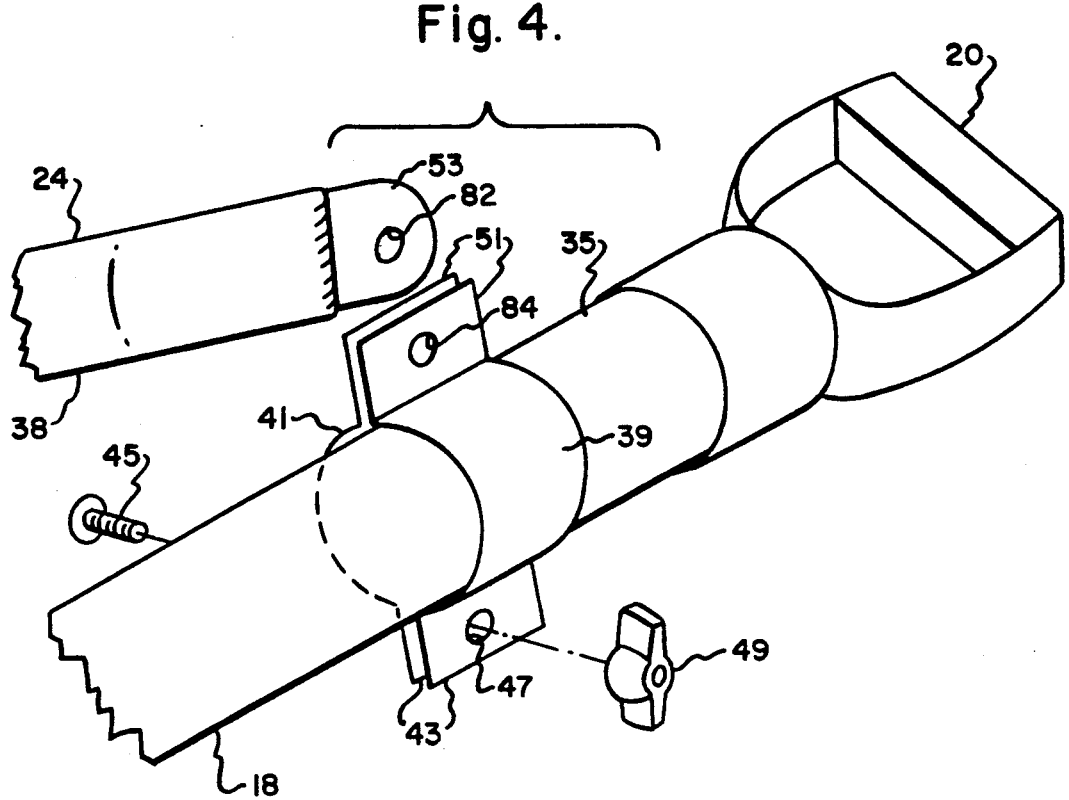
FIG. 4 is a partial, enlarged, exploded, perspective view illustrating the attachment of the long tubular means of the lift apparatus of FIG. 1 to the shovel thereof.

The other end of the first tubular means 24 is, as best seen in FIG. 4, attached to the end portion 35 of the handle 18 which is adjacent to the grip 20. Tubular means 24 is attached to handle 18 by suitable means such as a pair of "U" clamps 39 and 41 which surroundingly engage the handle 18, have a first pair of engaging flanges 43 secured by a screw 45 which passes through apertures 47 thereof and are threadedly engaged by wing nut 49. A second pair of diametrically opposed flanges 51 of clamps 39 and 41 receive therebetween a flattened end portion 53 of tubular means 24 and are attached to each other and to end portion 53 by means of a screw, shown at 55 in FIG. 1, which is similar to screw 45, which passes through apertures 82 and 84 in the flattened end portion 53 and in the flanges 51 respectively and is threadedly engaged by a wing nut (not shown) which is similar to wing nut 49. Screw 30 and the wing nut (not shown) engaged thereby are similar to screw 45 and wing nut 49 respectively. Tubular means 24 is thus pivotally attached to handle 18 as at screw or pivot 55.

The other end of the second tubular means 26 is attached to a clamp 36 which, if desired, may be similar to clamp 28 and which is securely attached to the end portion 37 of the handle 18 which is adjacent to the scoop 16, the tubular means 26 being so attached so as to extend generally normal to the handle 18. Thus, when the kit 14 is attached to the shovel 12, the second tubular means 26 extends generally vertically and the first tubular means 24 extends generally horizontally when the shovel 12 is held with the scoop 16 touching a driveway for normal use.

In order that the kit 14 may be adjustable for application to shovels of various sizes universally and for achieving optimal mechanical advantage for lifting while taking into consideration the size of the shovel and of the person using it, in accordance with the present invention the length of each of the tubular means 24 and 26 is adjustable. Such adjustability is provided by a pair of telescoping tubes 38 and 40 comprising the first tubular means 24 and a pair of telescoping tubes 42 and 44 comprising the second tubular means 26. Each of the tubes may be composed, for example, of thin walled aluminum tubing or other suitable material such as a polymer plastic.

Tube 38 is slideable within tube 40 to increase or decrease the length of the first tubular means 24 as indicated at 46. One end of the tube 38 is connected to "U" clamps 39 and 41. The other end, shown at 50 in FIG. 2, of tube 38 is contained within tube 40 and spaced from clamp 28 during normal attachment of the kit 14 to the shovel 12. One end of tube 40 is connected to clamp 28, and the other end 48 thereof is spaced from "U" clamps 39 and 41. Thus, by telescopically moving the tubes 38 and 40 relative to each other, the length of the first tubular means 24 may be increased or decreased as desired based on the size of the shovel and the person using it.

Figure 2:
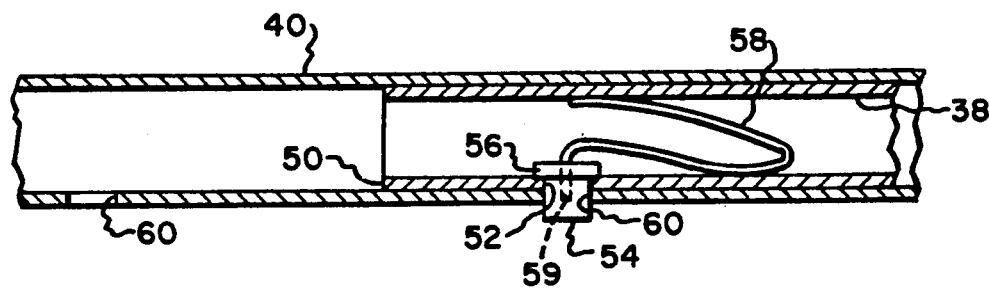
FIG. 2 is a side view of a biased button arrangement in engagement with a tubular means, shown in longitudinal section, of the apparatus of FIG. 1 for adjusting the length thereof.

Referring to FIG. 2, near the end 50, the wall of the tube 38 has an aperture, illustrated at 52, in which is received a cylindrical button 54 which is sized to protrude outwardly beyond the outer surface of tube 38. Button 54 has an enlarged cap portion 56 which is disposed within the tube 38 to provide a shoulder for preventing movement of the button 54 in an outwardly direction out of the aperture 52, the cap portion 56 having a diameter greater than the diameter of the aperture 52. A hairpin spring 58 is contained within the tube 38 and has one end which is engaged in an aperture 59 in the button 54 to bias the button 54 to the position shown in FIG. 2 wherein the cap portion 56 engages the inner wall of the tube 38 with the button 54 protruding outwardly from the aperture 52. The button 54 may be pushed inwardly against the force of the spring 58. Spaced along the length of tube 40 are a plurality of perhaps 6 apertures 60. Apertures 60 have generally the same diameter as aperture 52 for receiving button 54, as shown in FIG. 2. Thus, by causing the button 54 to engage aperture 52 and one of the apertures 60, the tubes 38 and 40 may be locked in position relative to each other for a desired length of the first tubular means 24. If it is desired to readjust the length of the tubular means 24, the button 54 may be pushed inwardly against the force of the spring 58 to clear the respective aperture 60 after which the tube 38 may be slid along the length of the tube 40 to a desired new location at which point the button 54 may be allowed to engage another one of the apertures 60 for locking the tubes 38 and 40 in position for a different length of the first tubular means 24.

One end of tube 44 is attached to clamp 28 and the other end 62 thereof is spaced from clamp 36 during normal attachment of the kit 14 to the shovel 12. One end of tube 42 is attached to clamp 36 and the other end (not shown) thereof is located within tube 44 and spaced from clamp 28. Tube 44 has a plurality of perhaps 4 apertures 64, which are similar to apertures 60, spaced along the length thereof. Tube 42 has an aperture (not shown) containing a spring biased button 57, similar to spring biased button 54, for the purposes of engaging one of the apertures 64 to lock the tubes 42 and 44 in position after the tubes have been moved telescopically relative to each other as illustrated at 67 for adjusting the length of the second tubular means 26, similarly as described for adjusting the length of the first tubular means 24. Therefore, the means for adjustment of the length of the second tubular means 26, being similar to the means for adjustment of the length of the first tubular means 24, is not described in greater detail herein. It should be understood that other suitable means may be provided for telescopically adjusting the lengths of the first and second tubular means and for pivotally attaching the first tubular means 24 to the handle 18 and to the second tubular means 26, and such other means are meant to come within the scope of the present invention.

With one hand on the grip 20, the user of shovel 12 may, with the kit 14 attached, grab the tube 40 for increased mechanical advantage, with minimum bending, in picking up a loaded scoop 16 and otherwise using the shovel. The lengths of the first and second tubular means 24 and 26 respectively may be adjusted, with corresponding pivotal movement about pivots 30 and 55, for the particular requirements of the shovel size and the user for achieving the greatest aid for use of a shovel.

Figure 3:
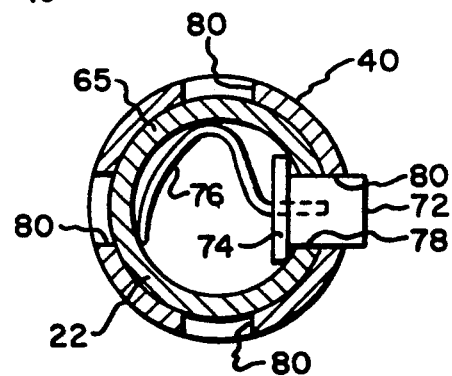
FIG. 3 is a side view of a biased button arrangement for lockingly engaging an elbow-shaped member of the apparatus of FIG. 1 with a tubular means thereof, the elbow-shaped member and tubular means shown in cross section.

Referring to FIG. 3, the member 22, which may be perhaps 6 inches long, is also composed of thin walled aluminum tubing or other suitable tubing and is elbow-shaped to have a first portion 65 and a second portion 66 which form an angle, illustrated at 88, of perhaps about 135 degrees with each other, and the portion 65 has a length of perhaps about 1 inch to be received within the end of tube 40 so that portion 66, which may have a length, illustrated at 86, of perhaps about 5 inches to thereby extend from the end of the first tubular means 24 a distance of about 5 inches, forms an angle of perhaps about 45 degrees with the axis of tube 40. The angle which the portions 65 and 66 form with each other may be greater or less than about 135 degrees, i.e., perhaps between about 105 and 165 degrees. The member 22 is rotatably adjustable within the end of tube 40 so that the portion 66 may extend upwardly, as shown in FIG. 1, to provide an easier hand hold for lifting the loaded shovel scoop upwardly or positioned to extend to the right or left side, as illustrated by phantom lines at 68, by rotation of member 22, as illustrated at 70, to aid in moving the shovel to the right to left for unloading the scoop. If desired, the member 22 may be adjustable so that portion 66 extends downwardly. Once the member 22 has been moved to the desired position relative to tube 40, it is locked in position by means of a button 72 having a head 74 and a hairpin spring 76, all similar to the button 54, head 56, and spring 58 of FIG. 2, or by other suitable means. The button 72 is engaged in aperture 78 in portion 65 and protrudes therefrom outwardly of the tube portion 65 to engage one of a plurality of perhaps four apertures 80 which are circumferentially spaced in the wall of the tube 40 for locking the position of member 22 in position. By pushing the button 72 inwardly to clear the respective aperture 80, the member 22 may be rotated to a different position and the button 72 allowed to engage one of the other apertures 80 to lock it into the new position.

The member 22 may thusly extend forwardly from the tube 40 to be more directly over the scoop 16 for optimizing the mechanical advantage, and the bend in the elbow member 22, allowing it to extend upwardly, allows the shovel to be more easily held by holding the elbow portion 66 for use. The adjustability of the elbow member so that the portion 66 extends to the right or left allows easier handling thereof for movement of the shovel to the right or left for unloading the scoop. The adjustability of the first and second tubular means 24 and 26 respectively not only allows the mechanical advantage to be optimized but also allows the assembly 14 to be sold as a kit for attachment readily and easily to shovels of various sizes.

The user of the kit 14 attached to a shovel 12 may hold the hand grip 20 with one hand and place the other hand at a comfortable point along the length of the tube 40 while sliding the shovel blade 16 along a surface such as a driveway in a forward direction until the scoop is loaded with snow or the like. The user may then remove the hand from the tube 40 and hold the portion 66 of the elbow-shaped member 22 to lift the load on the shovel blade by pulling up on the portion 66. The lifting force may thus act substantially directly over the load for maximum mechanical advantage. By positioning the elbow portion 66 to the right or left, as illustrated at 68, the user may hold the elbow portion 66 more easily for swinging the loaded shovel to the side for emptying the scoop.

For the purposes of illustration and not for limitation, a suitable kit 14 for use with a shovel may have the following sizes. The tube 40 may have a length of perhaps about 22 inches and have 6 apertures 60 equally spaced therealong. The tube 40 may have an inner diameter of perhaps about 15/16 inch. Tube 38 may have a length of perhaps about 22 inches and an outer diameter of perhaps about ⅞ inch. Aperture 52 may be located a distance of perhaps about 4 inches from the end 50 of tube 38. Tube 44 may have a length of perhaps about 22 inches, an inner diameter of perhaps about 15/16 inch, and have perhaps 4 apertures 64 equally spaced along the length thereof. Tube 42 may have a length of perhaps about 22 inches, an outer diameter of perhaps about ⅞ inch, and have an aperture for button 57 located perhaps about 4 inches from the end thereof which is within tube 44. Member 22 may have a length of perhaps about 6 inches with the length of portion 66 being perhaps about 5 inches and have an inner diameter of perhaps about 15/16 inch. Portions 66 and 65 may form an angle of perhaps about 135 degrees with each other. Clamps 28, 39 and 41, and 36 are suitably composed of carbon steel which has been electro-plated with a non-corroding metal such as nickel or zinc to prevent corrosion or rust. All ends of the tubes are preferably free of metal burrs and sharp edges.

The first and second tubular means 24 and 26 respectively may suitably each be telescopically adjusted so that its length is roughly 4/5 of the length of the handle 18. Since snow shovel handles typically have a length of between about 30 and 45 inches, for use with such shovels the first and second tubular means 24 and 26 respectively are preferably each adjustable to at least one length, illustrated at 82 and 84 respectively, within the range of about 24 to 36 inches. More preferably, each of the first and second tubular means is adjustable to lengths of both 20 and 30 inches. For example, for a shovel having a handle length, measured from the scoop to the grip or to the end of the handle if there is no grip, of 30 inches, the first and second tubular means 24 and 26 respectively may each be adjusted to a length of about 24 inches.

It is to be understood that the invention is by no means limited to the specific embodiments which have been illustrated and described herein and that various modifications thereof may indeed be made which come within the scope of the present invention as defined by the appended claims.

I claim:

1. Apparatus for attachment to a shovel for assisting lift thereof comprising a first tubular elongate means having a pair of end portions, means for telescopically adjusting said first tubular means to adjust the length thereof, a second tubular elongate means having a pair of end portions, means for telescopically adjusting said second tubular means to adjust the length thereof, each of said first and second tubular means being adjustable to at least one length within the range of about 24 to 36 inches, one of said end portions of said first tubular means being attached to one of said end portions of said second tubular means, means for attaching the other of said end portions of said first tubular means to a shovel handle near a hand grip end thereof, and means for attaching the other of said end portions of said second tubular means to the shovel handle near a scoop end thereof.

2. Apparatus according to claim 1 wherein each of said first and second tubular means is adjustable to lengths of both 24 and 36 inches.

3. Apparatus for attachment to a shovel for assisting lift thereof comprising a first tubular elongate means having a pair of end portions, a second tubular elongate means having a pair of end portions, one of said end portions of said first tubular means being attached to one of said end portions of said second tubular means, means for attaching the other of said end portions of said first tubular means to a shovel handle near a hand grip end thereof, means for attaching the other of said end portions of said second tubular means to the shovel handle near a scoop end thereof, a member having an elbow shape, and means for attaching said member to said one end portion of said first tubular means as an extension thereof with said member being rotatably adjustable.

4. Apparatus according to claim 3 wherein said member is attachable to said first tubular means to extend from said first tubular means a distance of about five inches and has a portion which forms an angle with said first tubular means which is about 135 degrees.

5. Apparatus according to claim 3 further comprising means for telescopically adjusting each of said first and second tubular means to adjust the lengths thereof.

6. Apparatus according to claim 5 wherein each of said first and second tubular means is adjustable to at least one length within the range of about 24 to 36 inches.

7. Apparatus comprising a shovel including a scoop means, an elongate handle, and a hand grip means, said handle having a scoop end portion and a hand grip end portion, a first tubular elongate means having a pair of end portions, means for telescopically adjusting said first tubular means to adjust the length thereof, a second tubular elongate means having a pair of end portions, means for telescopically adjusting said second tubular means to adjust the length thereof, one of said end portions of said first tubular means being attached to one of said end portions of said second tubular means, the other of said end portions of said first tubular means being attached to said hand grip end portion of said handle, and the other of said end portions of said second tubular means being attached to said scoop end portion of said handle.

8. Apparatus according to claim 7 further comprising a member having an elbow shape and attached to said one end portion of said first tubular means as an extension thereof and means for rotatably adjusting said member.

9. Apparatus according to claim 8 wherein said first and second tubular means are adjustable so that said first tubular means is generally horizontal and said member is located generally above said scoop means when said shovel is held by a person with the scoop means touching the ground during use.

10. Apparatus according to claim 8 wherein said member extends from said first tubular means a distance of about five inches.

11. Apparatus according to claim 10 wherein said member has a portion which forms an angle with said first tubular means which is about 135 degrees.

12. Apparatus according to claim 8 wherein said member has a portion which forms an angle with said first tubular means which is about 135 degrees.

* * * * *